United States Patent
Kuehl

[15] 3,684,079
[45] Aug. 15, 1972

[54] TRANSPORT DEVICE

[72] Inventor: Guenther L. Kuehl, Croton Ave., Peekskill, N.Y. 10566

[22] Filed: April 22, 1970

[21] Appl. No.: 38,640

Related U.S. Application Data

[62] Division of Ser. No. 798,366, Feb. 11, 1969, Pat. No. 3,578,145.

[52] U.S. Cl. ................................................198/139
[51] Int. Cl. ...............................................B65g 15/26
[58] Field of Search ........214/390, 89; 198/153, 154, 198/139, 208, 117, 110

[56] References Cited

UNITED STATES PATENTS

| | | |
|---|---|---|
| 2,436,657 | 2/1948 | McCulloch................198/139 |
| 2,491,255 | 12/1949 | Edwards....................198/139 |
| 3,223,260 | 12/1965 | Bright....................198/153 X |

*Primary Examiner*—Evon C. Blunk
*Assistant Examiner*—Hadd S. Lane
*Attorney*—Brumbaugh, Graves, Donohue & Raymond

[57] ABSTRACT

In the several embodiments of the invention described herein, an adjustable transport device is provided which includes a multiple chain drive system for transporting unit loads of material between a number of vertically and laterally displaced locations. In one embodiment, the device is provided as a truck attachment, and in a second embodiment, the vertical lift is permanently installed in a truck dock. In the third embodiment, a transport device for aircraft and the like carriers is provided with self-adjusting features and a unique platform construction. In a fourth embodiment, a transport device provides perpetual motion bridging for transporting people or material across obstacles and in the fifth and sixth embodiments, telescoping transport devices are provided. In a seventh embodiment, an inverted transport system is provided for transporting unit loads of material between at least three locations.

4 Claims, 3 Drawing Figures

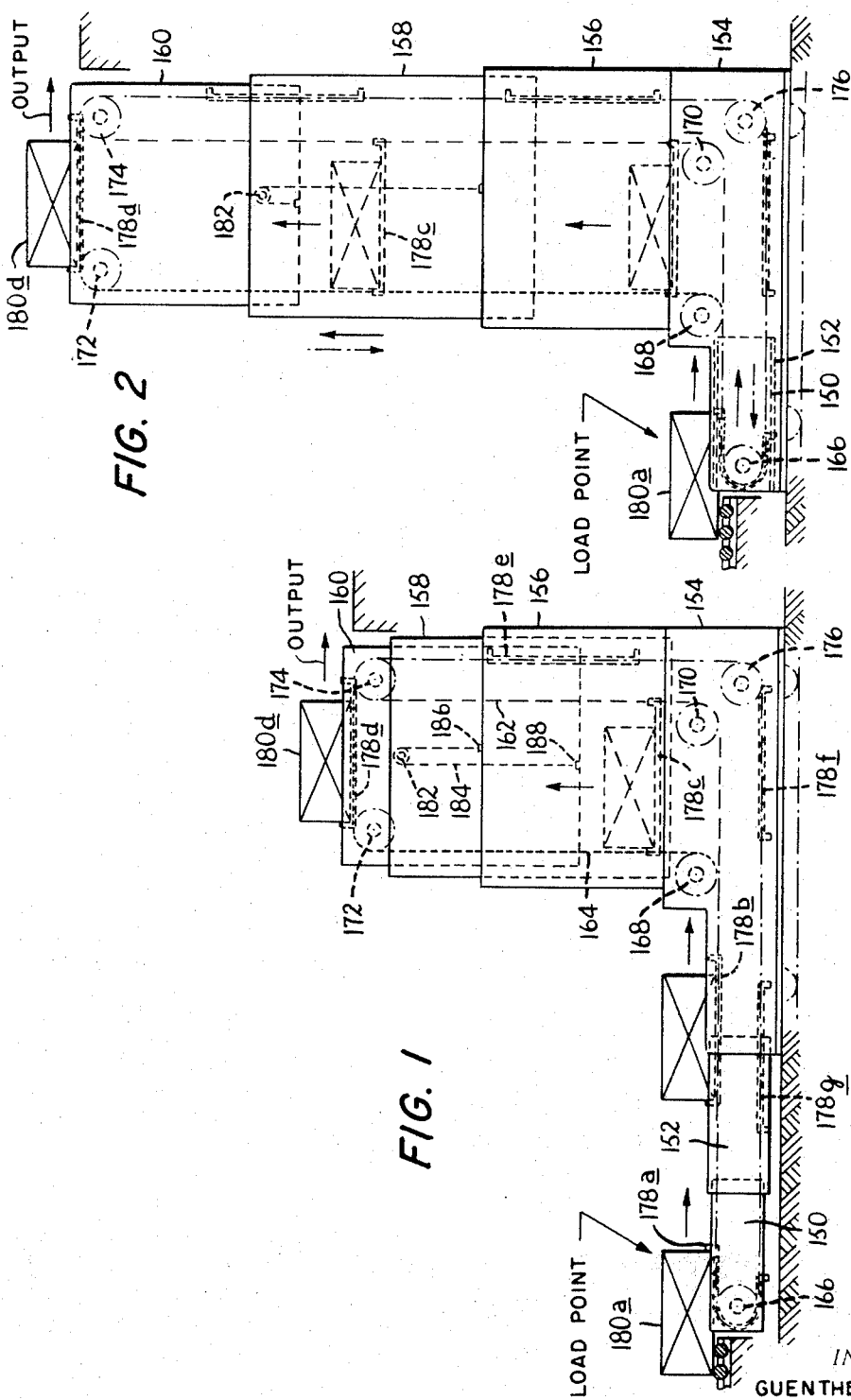

INVENTOR.
GUENTHER L. KUEHL

TRANSPORT DEVICE

This is a division of application Ser. No. 798,366, now Pat. No. 3,578,145 filed Feb. 11, 1969.

BACKGROUND OF THE INVENTION

This invention relates to conveyor apparatus and, more particularly, to apparatus for automatically transporting unit loads of material between vertically and laterally separated loading and unloading stations.

In many cargo loading systems for trucks and the like, the cargo is carried to a platform or truck dock by a conveyor belt and then picked up and loaded onto the truck by a fork lift truck. Where pallets are employed to carry the cargo, the cargo carrying pallet is transferred from the loading platform to the truck and then separated from the cargo in the truck itself. In another type loading system, vertical lifts are provided to convey the cargo between a truck and the loading platform. A common vertical lift is the double chain type which carries a platform to support the cargo, the platform remaining in a horizontal position during vertical movement by the supporting chains.

While the vertical lift type loading system provides obvious advantages over those systems utilizing fork lift trucks, a disadvantage with such systems is that each system must be uniquely designed to accommodate the expected vertical displacement between the cargo carrying trucks and the platform at each particular installation. For example, one installation may require a plurality of differently dimensioned vertical lift systems to accommodate the expected differences in truck sizes. In addition, because of the rigidity of the platforms carried by the vertical lifts of the prior art, limitations are placed in the directions travelled by the platform. This obviously restricts the uses to which the vertical lifts may be put. Also, none of the existing vertical lift type loading systems or elevators supply a cantilever motion to adjust to different locations of the loading or unloading station.

SUMMARY OF THE INVENTION

Accordingly, it is an object of the present invention to provide a transport device which overcomes the above-mentioned disadvantages of the prior art.

It is also an object of the present invention to provide a transport system which is adjustable in its vertical and horizontal dimensions and which is of unique and simple construction and susceptible of automatic operation.

It is still another object of the present invention to provide a transport device which includes a unique platform construction and chain drive system which makes it possible for one power source to move the platform continuously in any desired direction.

These and other objects are accomplished by the transport device of the present invention which comprises a plurality of pivotally connected support bars which define a support frame. At least two pairs of offset and movable endless flexible support members are supported by the frame and the support members are guided coextensively in a first direction by a first plurality of guide members. A second plurality of guide members guide one pair of the support members in a second direction back to the first plurality of guide members and third and fourth pluralities of spaced guide members guide the first and second pairs of support members, respectively, in a third direction to the first plurality of guide members and to the second plurality of guide members. Also provided is a reversible drive mechanism operatively coupled to the support members for moving the support members in either a first direction or a second direction.

BRIEF DESCRIPTION OF THE DRAWING

In the drawings:

FIGS. 1 and 2 illustrate schematically a telescoping transport device in two operative positions arranged according to the present invention;

DESCRIPTION OF THE PREFERRED EMBODIMENTS

Figure 3:
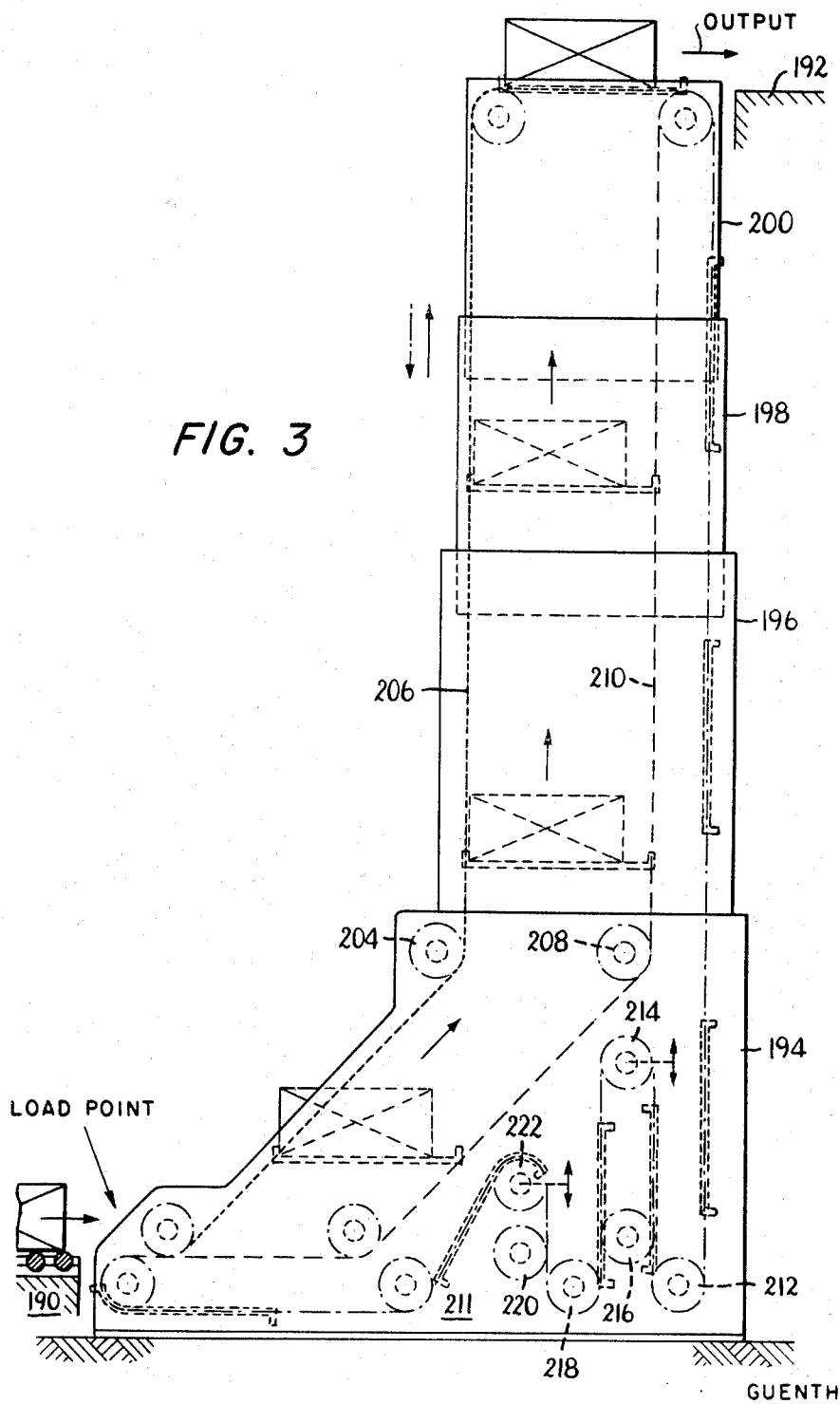
FIG. 3 illustrates schematically another embodiment of a telescoping transport device arranged according to the present invention.

In the illustrative transport device arranged according to the present invention as shown in FIGS. 1 and 2, a double telescoping transport device includes a first horizontal frame section 150, a second horizontal frame section 152 adapted to telescopically receive the first section 150 and a stationary housing member 154 adapted to telescopically receive the second section 152. Mounted on the stationary housing member 154 is a stationary frame section 156 which is adapted to telescopically receive a first vertical frame section 158. A second vertical frame section 160 is adapted to be telescopically received by the first vertical frame section 158.

The arrangement of the chain system and chain drive therefor in the transport device illustrated in FIGS. 1 and 2 corresponds to the arrangement of the chain system and chain drive therefor illustrated in FIGS. 1 through 4 of the U.S. Pat. No. 3,578,145 and, accordingly, need not be described in detail hereinafter. It suffices that the chain system comprises two pairs of inwardly and outwardly disposed endless loop chain pairs 162 and 164 which are guided and driven by suitably situated sprockets. Specifically, there are mounted in the horizontal frame section 150 two pairs of drive sprockets 166 for driving the chain pairs 162 and 164 in a horizontal direction, one pair of sprockets 168 mounted in the housing member 154 for guiding the outer chain pair 164 upwardly and a pair of guide sprockets 170 for guiding the inner chain pair 162 upwardly. Further provided are guide sprockets 172 mounted in the second vertical frame section 160 for guiding the outer chain pair 164 in a horizontal direction and two sets of guide sprockets 174 mounted in the section 160 for guiding the inner and outer chain pairs downwardly to two sets of corresponding guide sprockets 176 mounted in the stationary housing 154.

Again a plurality of spaced platforms 178a–178g are mounted between the endless loop chain pairs 162 and 164 such that, at the time a unit load of material 180a is being loaded onto the platform 178a, a unit load of material 180a is being deposited onto an unloading platform or an output station.

Mounted on the first vertical section 158 is a guide member 182 which may be, for example, a sprocket and which receives a coupling member 184 which may be, for example, a chain. At its opposite ends 186 and 188, the chain 184 is secured to the stationary frame 156 and to the second vertical section 160, respectively. The first section 158 is coupled to retain in a predetermined fixed vertical position within the stationary housing member 156 by a drive member (not shown) which may, for example, be an hydraulic lifter. When driven upwardly through the housing member 156 by the drive member (not shown) the section 158, by virtue of the coupling chain 184, carries with it the second vertical section 160.

Because of the tautness of the chain pairs 162 and 164, the upward movement by the vertical sections 158 and 160 causes the concurrent telescoping of the horizontal frame sections 150 and 152. Accordingly, when the vertical sections 158 and 160 have reached their maximum heights, as shown in FIG. 2, the horizontal sections 150 and 152 are telescoped fully within the section 152 and stationary housing member 154, respectively. Conversely, when the sections 158 and 160 are driven downwardly, the pressure by the chain pairs 162 and 164 will force the sections 150 and 152 to move laterally the maximum lateral position, as indicated in FIG. 1.

In the illustrative transport device arranged according to the present invention, as shown in FIG. 3, a modified telescoping transport device is provided which will accommodate variable differences in height between a loading station 190 and a load discharging or output station 192. The transport device comprises a stationary housing member 194, a support member 196 mounted on the housing member 194 and a pair of vertical sections 198 and 200 adapted to be received telescopically in the section 196 and the section 198, respectively.

The structure and operation of the transport device is generally similar to that of the transport device illustrated in FIGS. 1 and 2 except that only a vertical telescoping arrangement is provided in the FIG. 3 embodiment. Also, there are provided a pair of sprockets 204 mounted in the housing member 194 for guiding an outer chain pair 206 upwardly and a pair of chain sprockets 208 mounted in the member 194 for guiding an inner chain pair 210 upwardly through the transport device.

In addition, in order to maintain the tautness of the chain pairs 206 and 210 during the various changes in height of the transport device, the housing 194 is provided with a magazine section 211 which includes a plurality of spaced guide sprockets 212, 214, 216, 218, 220 and 222. As shown, the sprockets 214 and 222 are vertically movable in directions which oppose the movement by the telescoping sections 198 and 200. Specifically, as the telescoping sections 198 and 200 are driven upwardly to bring the device to its fullest vertical extent, the sprockets 214 and 222 are forced downwardly to decrease the extent of travel by the chain pairs 206 and 210 in the magazine section 211. As the sections 198 and 200 are telescoped into the sections 196 and 198, respectively, the sprockets 214 and 222 are forced upwardly to compensate for the decrease in chain run by adding to the chain run in the magazine section 211.

Although the invention has been described herein with reference to specific embodiments, many modifications and variations therein will readily occur to those skilled in the art. For example, all the sprockets, except for the drive sprockets, disclosed in the various embodiments of the invention may be replaced by plain discs and the like. Also, stationary guide supports mounted between the spaced sprockets may be provided to supply support for the chain pairs and to reduce lateral vibration by the platforms carried by the chain pairs. Accordingly, all such modifications and variations are included within the intended scope of the invention as defined by the following claims.

I claim:

1. A transport device comprising: a frame member, the frame member comprising at least a first housing member adapted for rectilinear movement and a second housing member having an opening formed in one end thereof for receiving telescopically the first housing member; at least two pairs of offset and movable endless flexible support members supported in their travel by the frame member, a first plurality of guide members for maintaining the flexible support members coextensive and for guiding the members in a first direction; a second plurality of guide members for guiding one pair of the support members to the first plurality of guide members in a second direction; and at least third and fourth pluralities of laterally spaced guide members responsive respectively to one of the two pairs of flexible support members for guiding the members to the first plurality of guide members and to the second plurality of guide members, respectively, in a third direction; and drive means operatively coupled to predetermined guide members for moving the guide members in either of two directions to implement the movement of the support members in either of the two directions.

2. A transport device according to claim 1 wherein the frame member further comprises a third housing member adapted for rectilinear horizontal movement and wherein the first housing member is adapted for rectilinear vertical movement and the second housing member has formed therein an opening in its upper end for receiving telescopically the first housing member and an opening formed in its lower end for receiving telescopically the third housing member.

3. A transport device according to claim 2 wherein the first plurality of guide members comprise two pairs of offset sprockets mounted in the first housing member and adapted to guide the offset endless flexible support members in their travel, another two pairs of sprockets vertically displaced from the two pairs of offset sprockets and mounted in the second housing member and still another two pairs of sprockets laterally displaced from said another two pairs of sprockets, located in the same vertical plane therewith and mounted in the third housing member.

4. A transport device according to claim 1 wherein the first housing member is adapted for rectilinear vertical movement, wherein the second housing member has formed therein an opening in its upper end for receiving telescopically the first housing member and wherein the first plurality of guide members further comprise means mounted in the second housing member for varying the distance travelled by the flexible support members as the first housing member is moved into and out of telescoping engagement with the second housing member.

* * * * *